US012592048B2

(12) United States Patent
Mulchandani et al.

(10) Patent No.: US 12,592,048 B2
(45) Date of Patent: Mar. 31, 2026

(54) SYSTEM AND METHOD FOR CREATING ANCHORS IN AUGMENTED OR MIXED REALITY

(71) Applicant: Schlumberger Technology Corporation, Sugar Land, TX (US)

(72) Inventors: Kishore Mulchandani, Menlo Park, CA (US); Swaroop Kalasapur, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 65 days.

(21) Appl. No.: 18/737,274

(22) Filed: Jun. 7, 2024

(65) Prior Publication Data

US 2024/0412469 A1 Dec. 12, 2024

Related U.S. Application Data

(60) Provisional application No. 63/506,665, filed on Jun. 7, 2023.

(51) Int. Cl.
*G06T 19/00* (2011.01)
*G06V 10/44* (2022.01)

(52) U.S. Cl.
CPC ............ *G06T 19/006* (2013.01); *G06V 10/44* (2022.01)

(58) Field of Classification Search
CPC ....... G06T 19/006; G06V 10/44; G06V 20/20
USPC ......................................................... 345/633
See application file for complete search history.

(56) References Cited

U.S. PATENT DOCUMENTS

| | | | | |
|---|---|---|---|---|
| 2014/0368688 A1* | 12/2014 | John Archibald | ... | H04N 23/611 |
| | | | | 348/222.1 |
| 2019/0012836 A1* | 1/2019 | Lim | ....................... | G06V 20/20 |
| 2019/0043201 A1* | 2/2019 | Strong | ................... | G06V 10/96 |
| 2019/0114802 A1* | 4/2019 | Lazarow | ............. | H04W 56/001 |
| 2020/0273235 A1* | 8/2020 | Emami | ..................... | G06T 7/50 |
| 2020/0372291 A1* | 11/2020 | Dey | ........................ | G06V 20/64 |
| 2021/0004589 A1* | 1/2021 | Turkelson | ............ | G06V 10/809 |
| 2021/0311545 A1* | 10/2021 | Bae | ........................ | G06T 19/006 |
| 2021/0407125 A1* | 12/2021 | Mahendran | .............. | G06N 3/04 |
| 2023/0092874 A1* | 3/2023 | Krivoruchko | ........... | G06F 3/012 |
| | | | | 715/849 |
| 2023/0126837 A1* | 4/2023 | Karadayi | ................ | G06F 9/451 |
| | | | | 345/419 |
| 2023/0127438 A1* | 4/2023 | Karadayi | .............. | G06T 17/005 |
| | | | | 345/419 |

(Continued)

*Primary Examiner* — David T Welch
(74) *Attorney, Agent, or Firm* — Kyle R. Miiller

(57) ABSTRACT

A method for creating anchors that are resilient to changes in a dynamic environment includes capturing a first dataset of an environment with a sensor of a system at a first time. The method may also include identifying a plurality of features in the first dataset. The method may also include generating a hierarchy of the features based upon the features in the first dataset. The method may also include capturing a second dataset of the environment with the sensor of the system at a second time. The second time is after the first time. The method may also include identifying at least some of the features in the second dataset. The method may also include updating the hierarchy of the features based upon the features in the second dataset. The method may also include generating a first anchor in response to updating the hierarchy of the features.

19 Claims, 16 Drawing Sheets

(56) References Cited

U.S. PATENT DOCUMENTS

| | | | |
|---|---|---|---|
| 2023/0186570 A1* | 6/2023 | Moratto | G06T 17/05 |
| | | | 345/633 |
| 2024/0281996 A1* | 8/2024 | Nandipati | G06T 7/579 |
| 2024/0331246 A1* | 10/2024 | Bell-Geddes | G06T 19/006 |
| 2025/0044911 A1* | 2/2025 | Krivoruchko | G06F 3/017 |
| 2025/0342442 A1* | 11/2025 | Hartmann | G06T 19/006 |

* cited by examiner

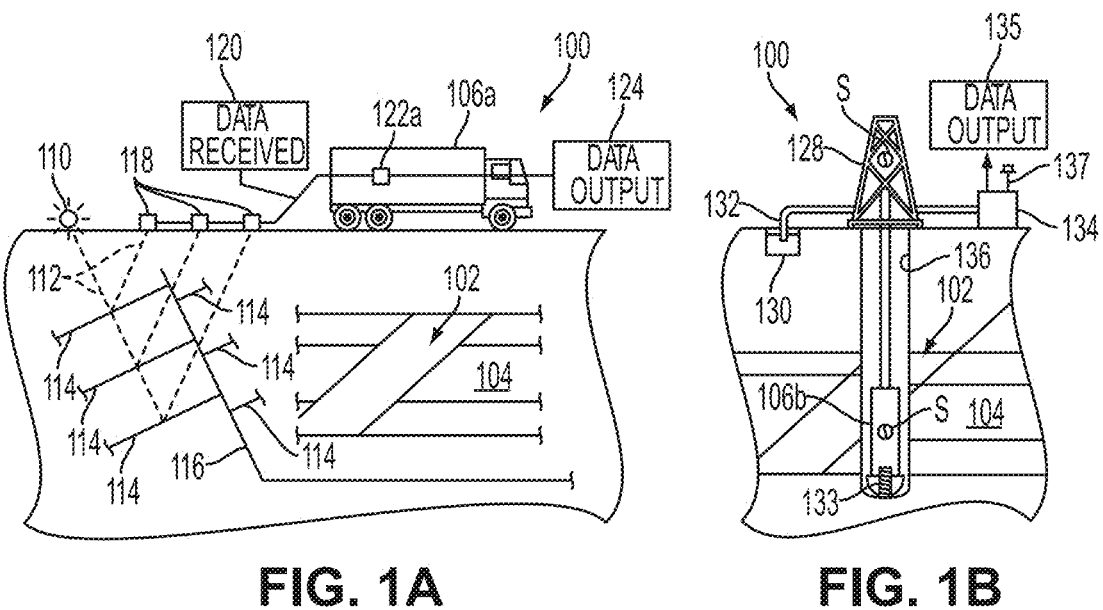
FIG. 1A          FIG. 1B
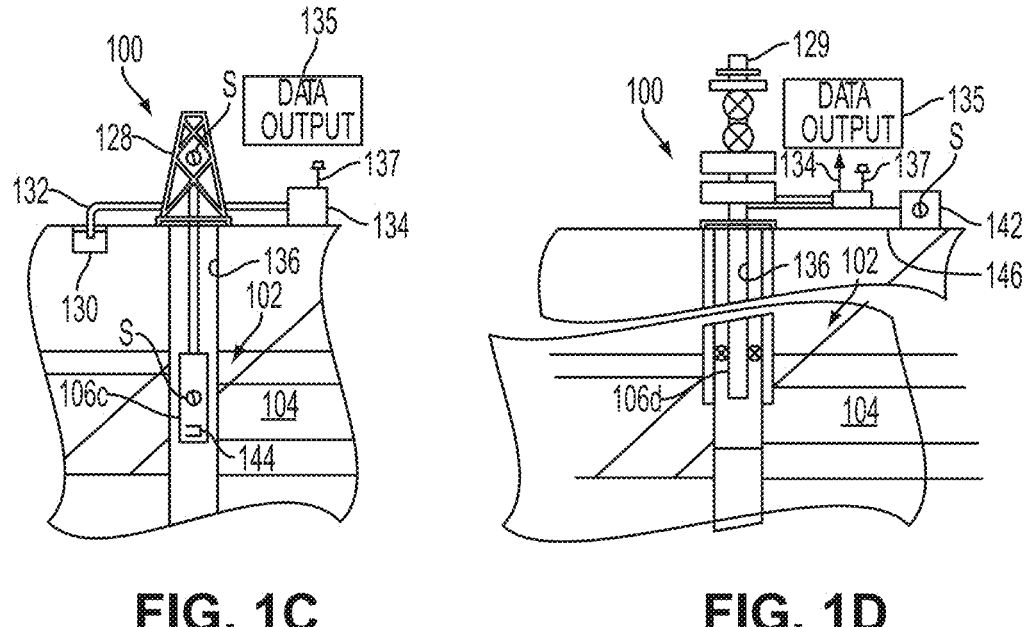
FIG. 1C          FIG. 1D

600

700

900

1000

1200

START

FOR EACH PAIR OF FEATURE (A, B) AT SAME LEVEL IN A HIERARCHY

COMPUTE FEATURE A SPATIAL DIMENSIONS — 1210

1220 — COMPUTE FEATURE B'S SPATIAL DIMENSIONS

1230 — IS FEATURE A "WITHIN" FEATURE B ?

YES → FEATURE A IS MOVED TO B'S CHILDREN — 1240

NO

1250 — IS FEATURE B "WITHIN" FEATURE A ?

YES → FEATURE A IS MOVED TO B'S CHILDREN — 1260

NO

1270 — FEATURE A, B STAY AT CURRENT HIERARCHICAL LEVEL

END

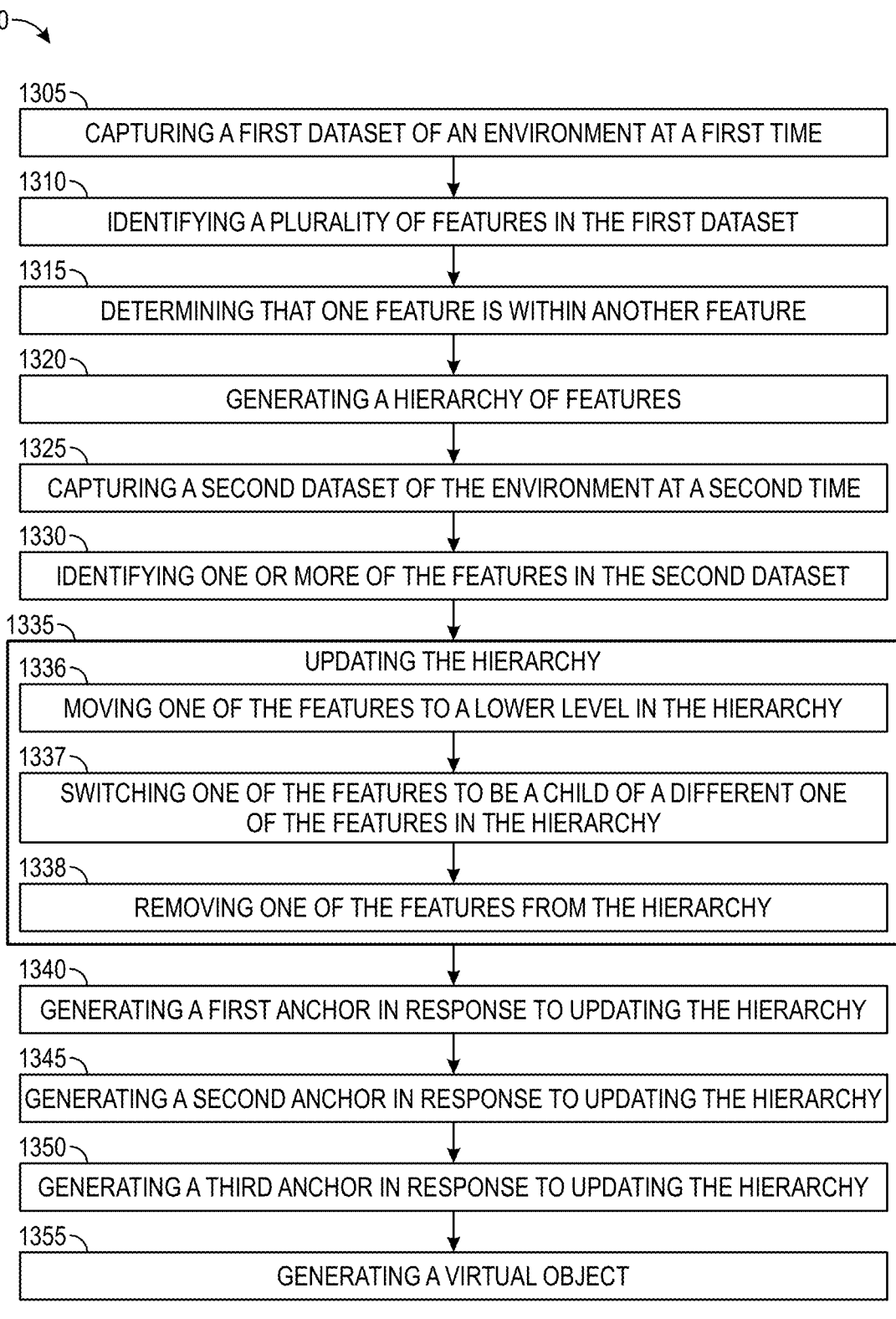

1300

1305
CAPTURING A FIRST DATASET OF AN ENVIRONMENT AT A FIRST TIME

1310
IDENTIFYING A PLURALITY OF FEATURES IN THE FIRST DATASET

1315
DETERMINING THAT ONE FEATURE IS WITHIN ANOTHER FEATURE

1320
GENERATING A HIERARCHY OF FEATURES

1325
CAPTURING A SECOND DATASET OF THE ENVIRONMENT AT A SECOND TIME

1330
IDENTIFYING ONE OR MORE OF THE FEATURES IN THE SECOND DATASET

1335
UPDATING THE HIERARCHY

1336
MOVING ONE OF THE FEATURES TO A LOWER LEVEL IN THE HIERARCHY

1337
SWITCHING ONE OF THE FEATURES TO BE A CHILD OF A DIFFERENT ONE OF THE FEATURES IN THE HIERARCHY

1338
REMOVING ONE OF THE FEATURES FROM THE HIERARCHY

1340
GENERATING A FIRST ANCHOR IN RESPONSE TO UPDATING THE HIERARCHY

1345
GENERATING A SECOND ANCHOR IN RESPONSE TO UPDATING THE HIERARCHY

1350
GENERATING A THIRD ANCHOR IN RESPONSE TO UPDATING THE HIERARCHY

1355
GENERATING A VIRTUAL OBJECT

FIG. 13

SYSTEM AND METHOD FOR CREATING ANCHORS IN AUGMENTED OR MIXED REALITY

CROSS-REFERENCE TO RELATED APPLICATIONS

This application claims priority to U.S. Provisional Patent Application No. 63/506,665, filed on Jun. 7, 2023, which is incorporated by reference herein its entirety.

BACKGROUND

When using augmented reality (AR) or mixed reality (MR) devices, a user can see virtual objects embedded in their real environment. These virtual objects can be fixed or anchored to real-world objects or can move with the AR device. When the virtual objects are anchored to the real-world objects, the anchoring can be "remembered" across multiple launches of the same application in the device. In other words, once the anchoring is accomplished, a user can turn off the device, turn it back on, and the anchored virtual object would appear in the same location as before. For example, if the user places a virtual flowerpot on a table, it will appear in the exact same location after the device is restarted.

However, conventional AR and MR systems generate persistent robust anchors that persist despite changes to the environment. In other words, these anchors may not be triggered due to new objects being introduced. In addition, multiple anchors are triggered when many of them are created at the same location or near each other but were supposed to activate during various times. Moreover, conventional spatial anchors can get confused when new objects are introduced. For example, during maintenance, "orange" cones or warning signs may be erected and may prevent a previously-established anchor from working.

Therefore, what is needed is an improved system and method for creating anchors in AR or MR.

SUMMARY

A method for creating anchors that are resilient to changes in a dynamic environment is disclosed. The method includes capturing a first dataset of an environment with a sensor of a system at a first time. The method may also include identifying a plurality of features in the first dataset. The method may also include generating a hierarchy of the features based upon the features in the first dataset. The method may also include capturing a second dataset of the environment with the sensor of the system at a second time. The second time is after the first time. The method may also include identifying at least some of the features in the second dataset. The method may also include updating the hierarchy of the features based upon the features in the second dataset. The method may also include generating a first anchor in response to updating the hierarchy of the features.

A computing system is also disclosed. The computing system includes one or more processors and a memory system including one or more non-transitory computer-readable media storing instructions that, when executed by at least one of the one or more processors, cause the computing system to perform operations. The operations include capturing a first dataset of an environment with a sensor of a system at a first time. The operations also include identifying a plurality of features in the first dataset. The plurality of features includes at least a first feature and a second feature. The operations also include generating a hierarchy of features including the first feature and the second feature. The hierarchy of features is generated based upon the first feature and the second feature in the first dataset. The operations also include capturing a second dataset of the environment with the sensor of the system at a second time. The second time is after the first time. The operations also include identifying the first feature and the second feature in the second dataset. The first feature is in a same location in the first dataset and the second dataset. The second feature is in different locations in the first dataset and the second dataset. The operations also include updating the hierarchy of features based upon the first feature and the second feature in the second dataset. Updating the hierarchy comprises moving the second feature to a lower level in the hierarchy of features in response to the second feature being in different locations. The operations also include generating a first anchor in response to updating the hierarchy of features.

A computer program is also disclosed. The computer program includes instruction that, when executed by a computer processor of a computing device, cause the computing device to perform operations. The operations include capturing a first dataset of an environment with a sensor of a first system at a first time. The sensor is a red-green-blue (RGB) camera, an infrared camera, a lidar, or a combination thereof. The first system is an augmented reality (AR) system or a mixed reality (MR) system. The operations also include identifying a plurality of features in the first dataset. The plurality of features comprises at least a first feature, a second feature, a third feature, a fourth feature, and a fifth feature. The operations also include determining that the third feature is within the first feature such that the first feature and the third feature have a container-contained relationship. The operations also include generating a hierarchy of features including the first feature, the second feature, the third feature, the fourth feature, and the fifth feature. The hierarchy of features is generated based upon the first feature, the second feature, the third feature, the fourth feature, and the fifth feature in the first dataset. The third feature is a child of the first feature in the hierarchy of features in response to the third feature being within the first feature. The fourth feature is a child in the hierarchy of features. The operations also include capturing a second dataset of the environment with the sensor of the first system at a second time. The second time is after the first time. The operations also include identifying the first feature, the second feature, the third feature, and the fourth feature in the second dataset. The first feature is in a same location in the first dataset and the second dataset. The second feature is in different locations in the first dataset and the second dataset. The fourth feature is in different locations in the first dataset and the second dataset. The fifth feature is not present in the second dataset. The operations also include updating the hierarchy of features based upon the first feature, the second feature, the third feature, and the fourth feature in the second dataset. Updating the hierarchy includes moving the second feature to a lower level in the hierarchy of features in response to the second feature being in different locations. Updating the hierarchy also includes switching the fourth feature to be a child of a different one of the plurality of features in response to the fourth feature being in different locations. Updating the hierarchy includes removing the fifth feature from the hierarchy of features in response to the fifth feature not being present in the second dataset. The operations also include generating a first anchor in response to updating the hierarchy of features. The first feature having a higher level than the second, third, and fourth features causes the first feature to have a greater weight value than the second, third, and fourth features for matching the first anchor. The operations also include generating a virtual object inside a headset or a screen of the first system based upon the first anchor.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 13 illustrates a flowchart of a method for creating anchors that are resilient to changes in a dynamic environment, according to an embodiment.

DETAILED DESCRIPTION

Figure 2:
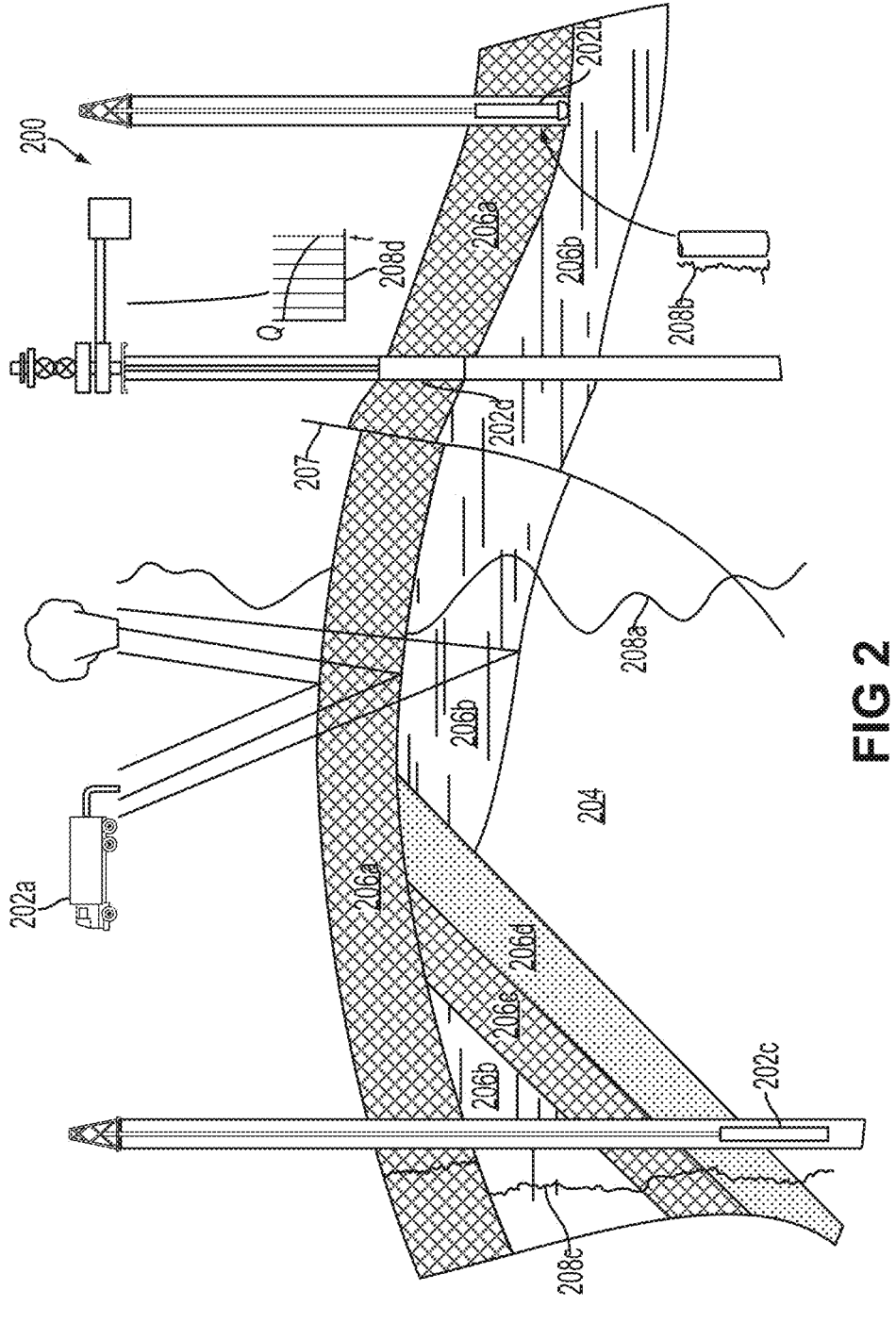

Reference will now be made in detail to embodiments, examples of which are illustrated in the accompanying drawings and figures. In the following detailed description, numerous specific details are set forth in order to provide a thorough understanding of the system and method described herein. However, it will be apparent to one of ordinary skill in the art that the system and method described herein may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the system and method described herein. The first object and the second object are both objects, respectively, but they are not to be considered the same object.

The terminology used in the description of the system and method described herein is for the purpose of describing particular embodiments only and is not intended to be limiting of the system and method described herein. As used in the description of the system and method described herein and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

System Overview

FIGS. 1A-1D illustrate simplified, schematic views of oilfield 100 having subterranean formation 102 containing reservoir 104 therein in accordance with implementations of various technologies and techniques described herein. Although embodiments of the present method are at least partially described herein with reference to an oilfield, it will be appreciated that this is merely an illustrative example. Embodiments of the present method may be employed in any application in which visualizing, modeling, or otherwise identifying subsurface features (e.g., geological features) may be useful. Examples outside of the oilfield context include subsurface mapping for wind arrays and/or solar arrays, geothermal energy production, mining operations, offshore/deep ocean applications, etc.

FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors(S), such as gauges, may be positioned about oilfield 100 to collect data relating to various oilfield operations as described previously. As shown, sensor(S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors(S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors(S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors(S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106d in wellbore 136 and to surface facilities 142 via gathering network 146.

Sensors(S), such as gauges, may be positioned about oilfield 100 to collect data relating to various field operations as described previously. As shown, the sensor(S) may be positioned in production tool 106*d* or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors(S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202*a*, 202*b*, 202*c*and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*d* of FIGS. 1A-1D, respectively, or others not depicted. As shown, data acquisition tools 202.1-202.4 generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that typically provides a resistivity or other measurement of the formation at various depths.

A production decline curve or graph 208*d* is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206*a*-206*d*. As shown, this structure has several formations or layers, including a shale layer 206.1, a carbonate layer 206*b*, a shale layer 206*c* and a sand layer 206*d*. A fault 207 extends through the shale layer 206*a* and the carbonate layer 206*b*. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208*a* from data acquisition tool 202*a* is used by a geophysicist to determine characteristics of the subterranean formations and features. The core data shown in static plot 208*b* and/or log data from well log 208*c* are typically used by a geologist to determine various characteristics of the subterranean formation. The production data from graph 208*d* is typically used by the reservoir engineer to determine fluid flow reservoir characteristics. The data analyzed by the geologist, geophysicist and the reservoir engineer may be analyzed using modeling techniques.

Figure 3A:
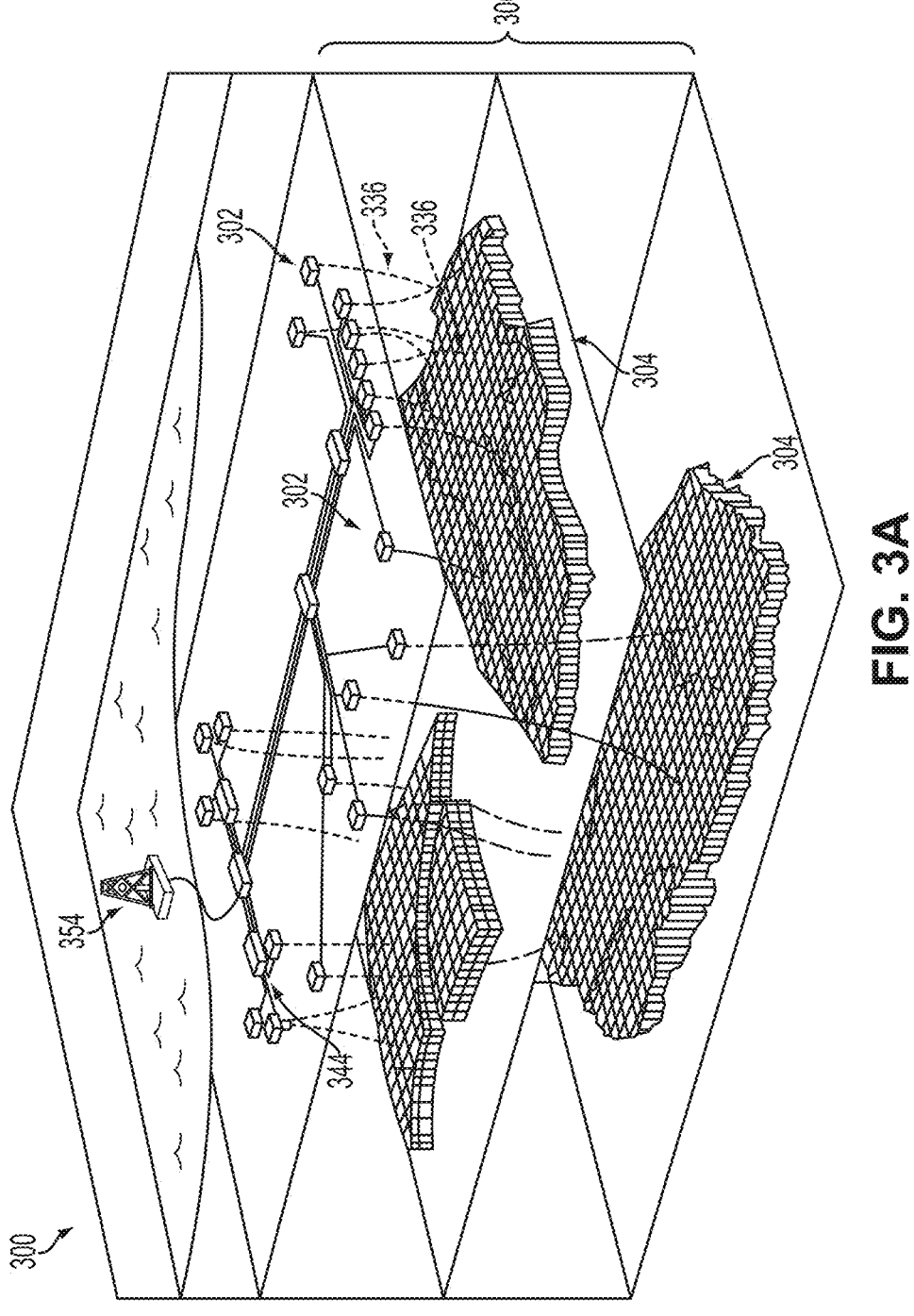

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
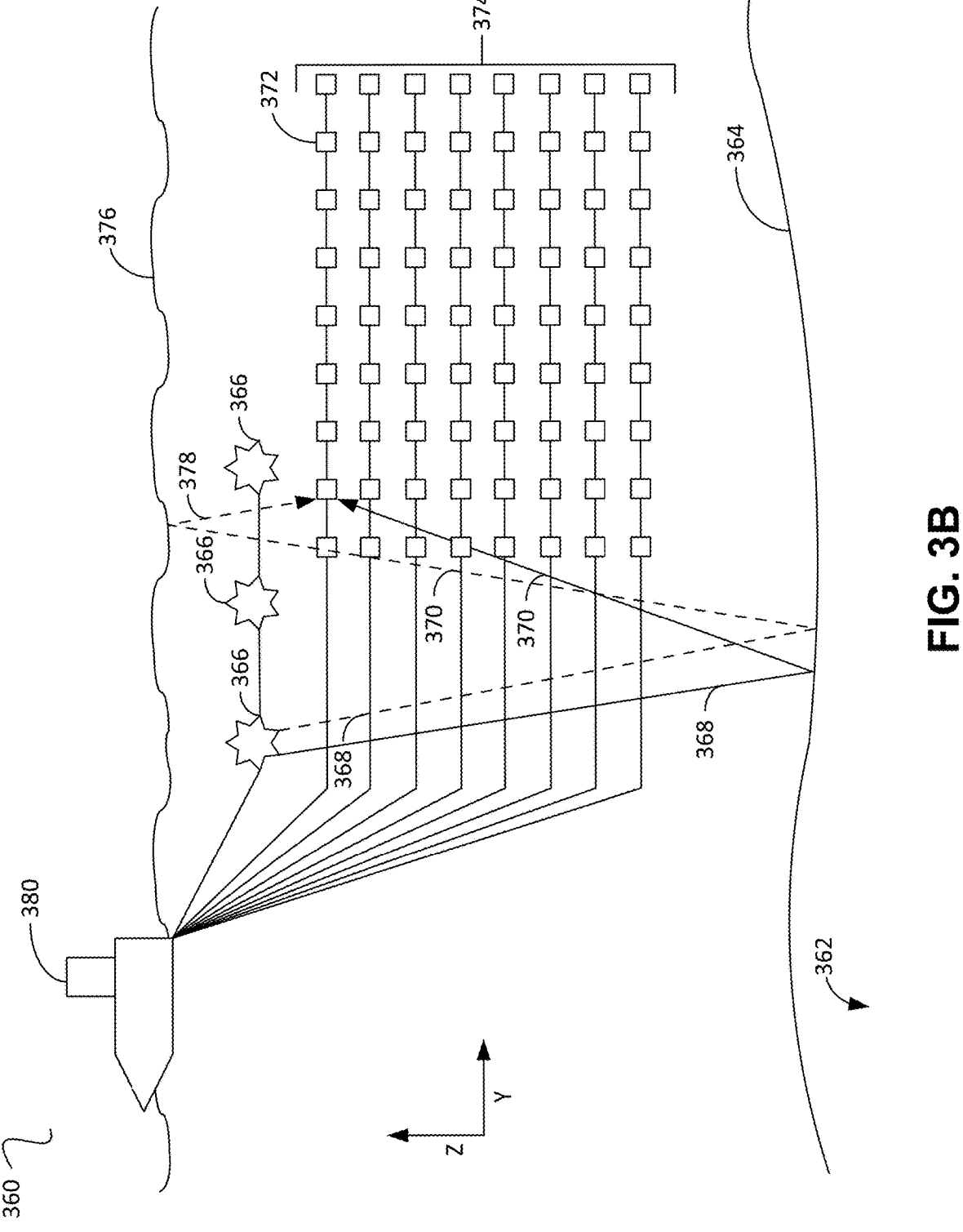

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Schematic View of an AR System

Figure 4:
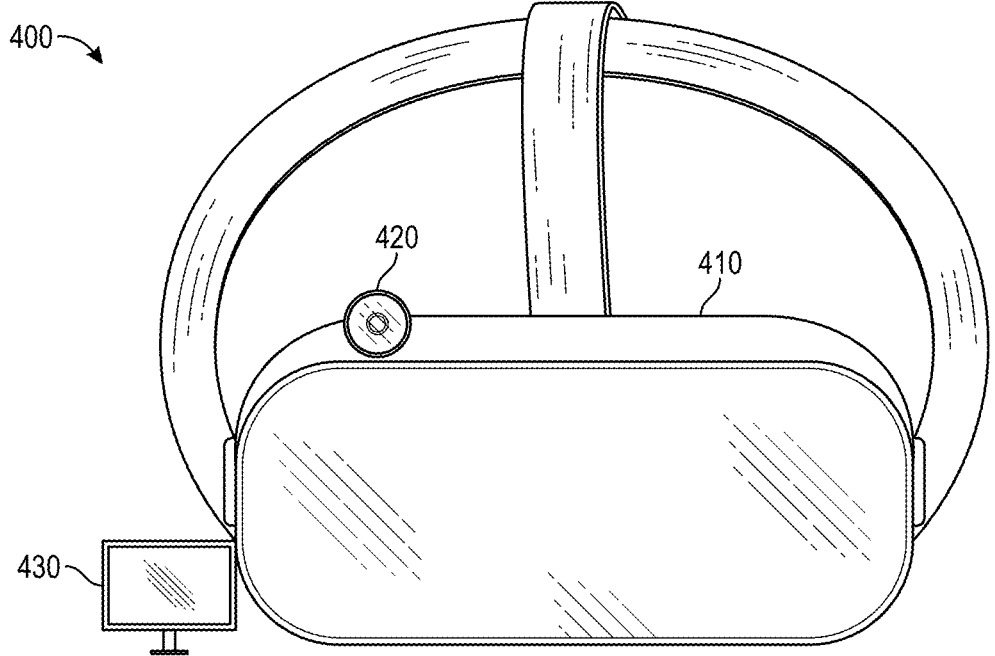
FIG. 4 illustrates a schematic view of an AR system, according to an embodiment.

FIG. 4 illustrates a schematic view of an AR system 400, according to an embodiment. The AR system 400 may include a headset 410 that is configured to be worn on the head of a user. The AR system 400 also includes one or more sensors 420 that are coupled to the headset 410. The sensor(s) 420 may be or include a red-green-blue (RGB) camera, an infrared camera, a spectral camera, a lidar, or a combination thereof. The sensor(s) 420 may be configured to capture one or more datasets (e.g., images) of the surrounding environment. The AR system 400 also includes a computing system 430 that is coupled to the headset 410. The computing system 430 may be configured to receive and analyze the dataset(s) from the sensor(s) 420. The computing system 430 may also identify and extract features from the images. The computing system 430 may also match the extracted features against stored features in a database of the computing system 430. As used herein, a "feature" refers to a point, a line, a plane, a plane normal, or other geometric properties, or combination thereof, either directly measured or derived. In another embodiment, the features may be or include tags or object shapes (e.g., buttons). Thus, an entire sub-hierarchy may be considered to be a feature.

Examples of User(s) Wearing the System

Figure 5A:
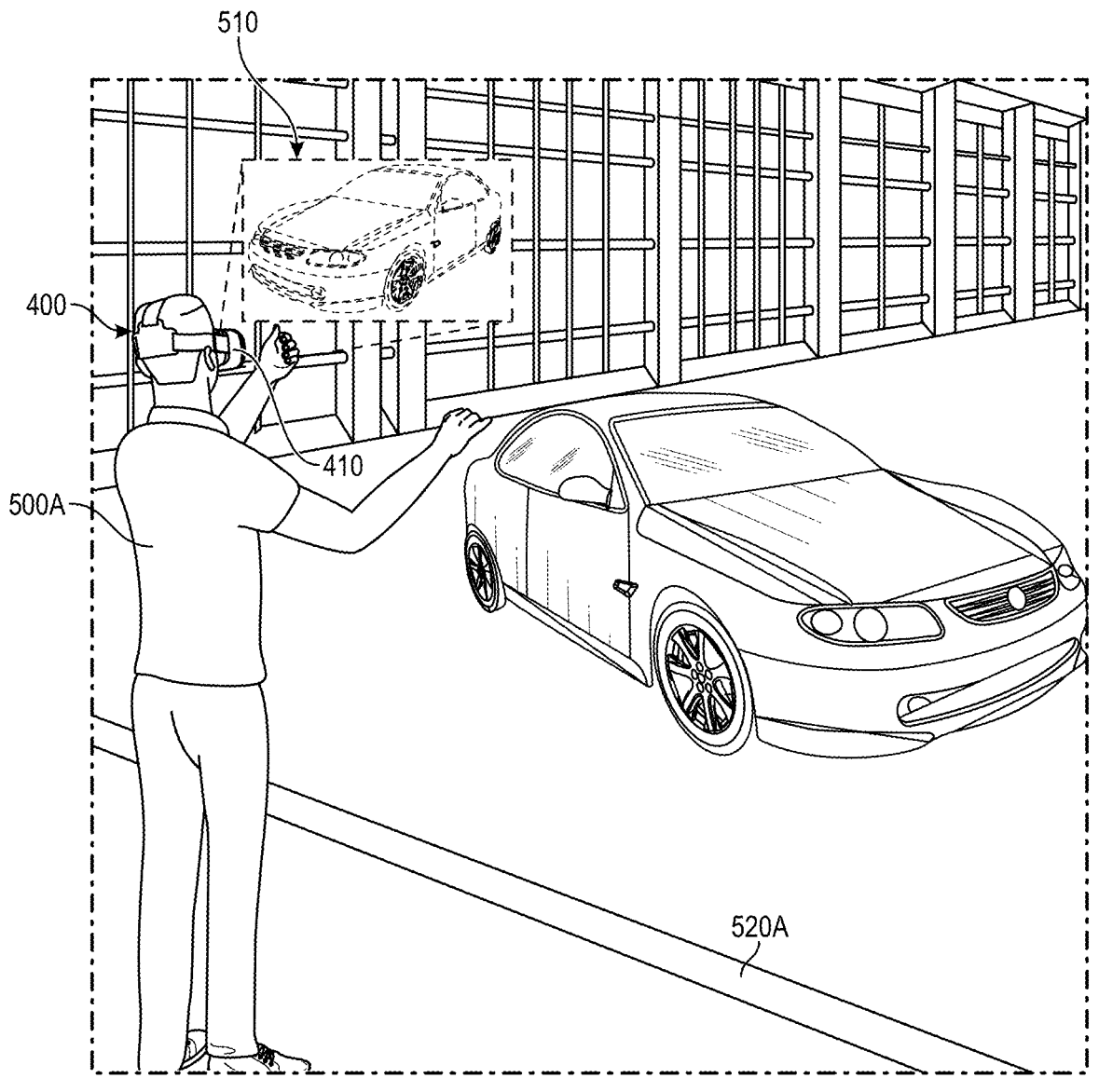
FIG. 5A illustrates a single user wearing the system and looking at a virtual 3D car inside a headset of the system, according to an embodiment.
Figure 5B:
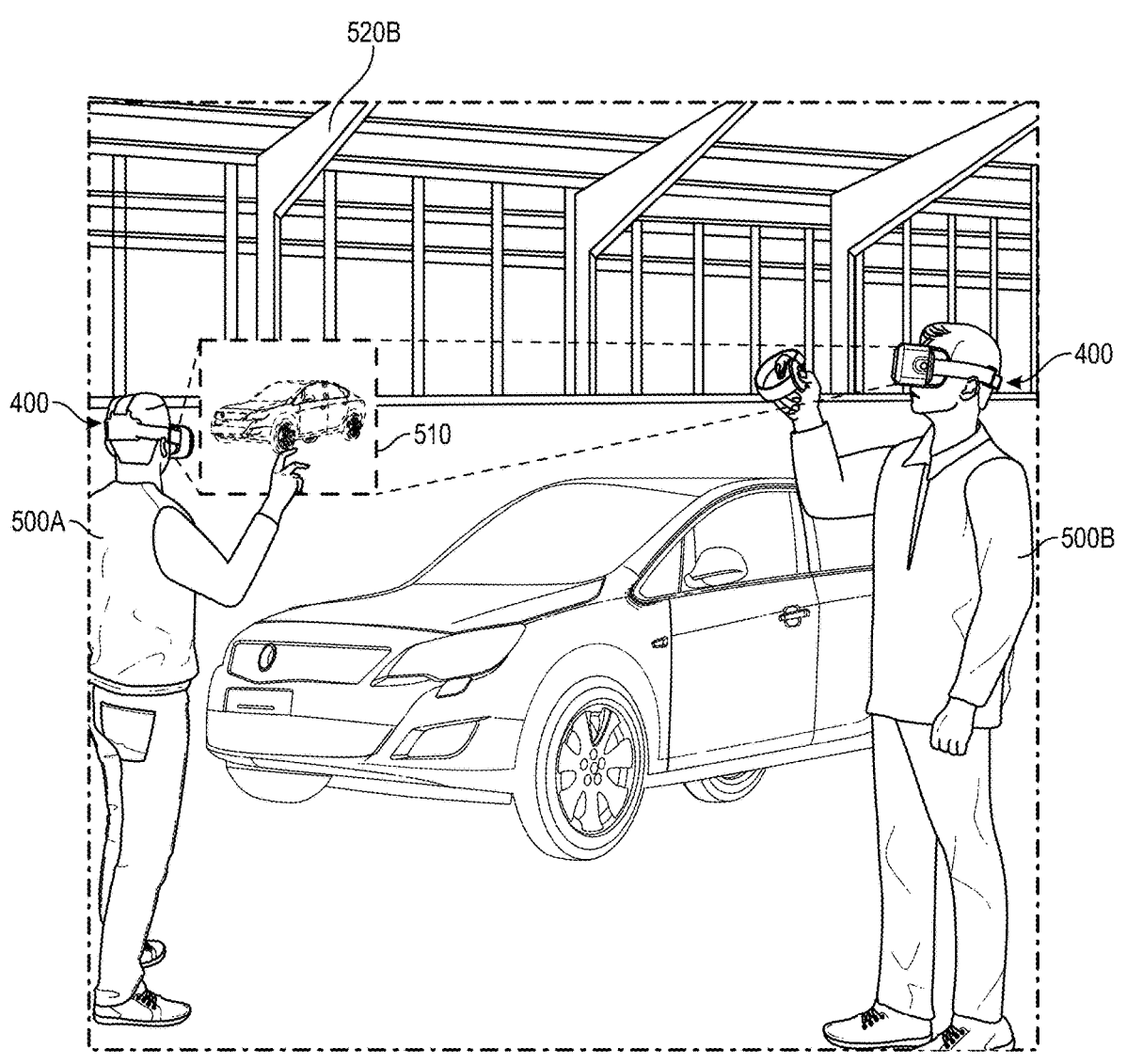
FIG. 5B illustrates two users wearing the system and looking at the virtual 3D car inside their headsets, according to an embodiment.

FIG. 5A illustrates a single user 500A wearing the system 400 (e.g., the headset 410) and looking at a virtual 3D car 510 inside the headset 410, according to an embodiment. FIG. 5B illustrates two users 500A, 500B wearing the system 400 (e.g., the headset 410) and looking at the virtual 3D car 510 inside their headsets 410, according to an embodiment. The system(s) 400 may allow the user(s) 500A, 500B to see the virtual 3D car 510 at a particular location in 3D space using spatial anchoring.

Spatial anchoring relies on matching the current location of the AR system(s) 400 with that of a previously-stored location. This may be accomplished by generating one or more spatial anchors (two are shown: 520A, 520B). In this example, the spatial anchor 520A is a stair/step in the floor, and the spatial anchor 520B is a structural beam in the wall. When an anchor 520A, 520B is created, it may have a feature set that was captured from what the AR system 400 processed at the time. Later, when the AR system 400 sees the same or a similar configuration of features that match the stored data, the AR system 400 "recognizes" the location and provides the coordinate system that allows the application to display any "anchored" virtual objects (e.g., the virtual 3D car 510) to that location.

Example Flowchart for Generating an Anchor

Figure 6:
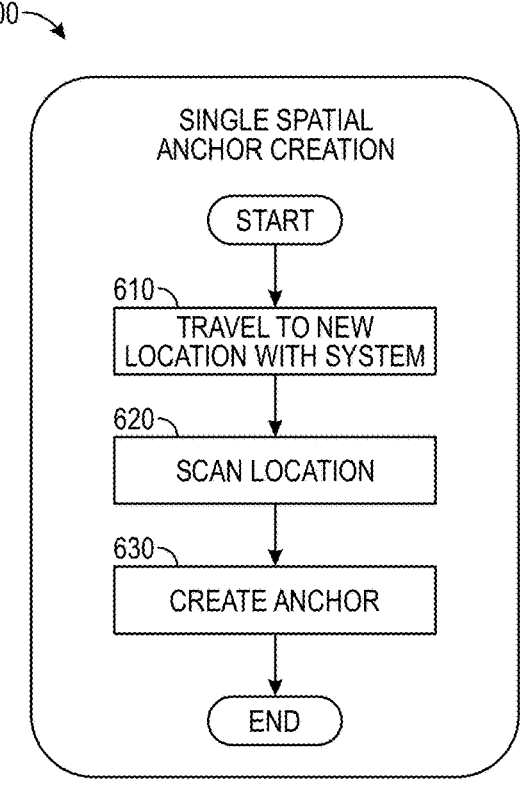
FIG. 6 illustrates a flowchart of a method for generating an anchor, according to an embodiment.

FIG. 6 illustrates a flowchart of a method 600 for generating an anchor 520A, 520B, according to an embodiment. The method 600 may include traveling to a new location with the system 400, as at 610. The method 600 may also include scanning the new location with the system 400, as at 620. More particularly, the new location may be scanned with the sensor(s) 420. The method 600 may also include creating one or more anchors 520A, 520B, as at 630. The anchors 520A, 520B may be created based upon the scan(s) of the new location. The anchors 520A, 520B may then be stored in the database in the computing system 430.

Example Flowchart for Anchor Matching

Figure 7:
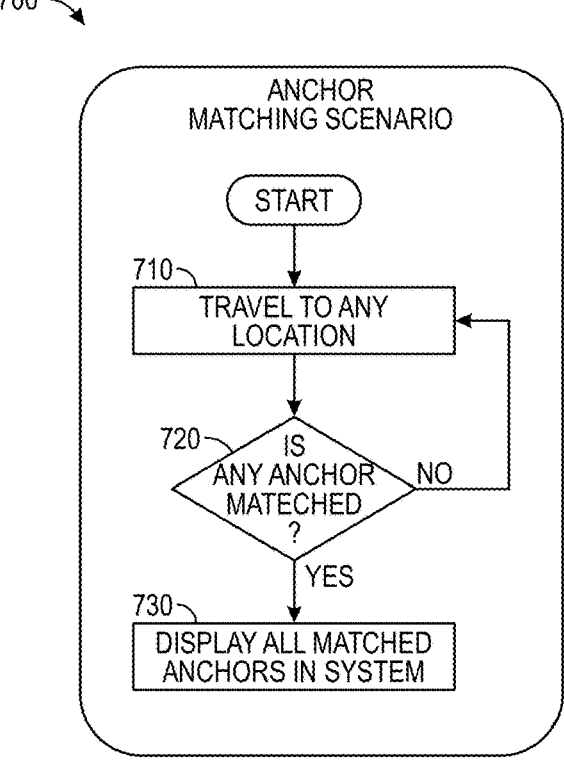
FIG. 7 illustrates a flowchart of a method for anchor matching, according to an embodiment.

FIG. 7 illustrates a flowchart of a method 700 for anchor matching, according to an embodiment. The method 700 may include travelling to any location, as at 710. The method 700 may also include determining whether any anchor is matched, as at 720. This may include scanning the location with the sensor(s) 420, identifying and extracting features in the images, and comparing the features in the scanned images with stored features in the database to determine whether any anchors 520A, 520B are matched. The method 700 may also include displaying the anchors 520A, 520B, as at 730.

Anchor matching may be partial and/or have a confidence factor. In one embodiment, an anchor match may be identified if greater than a predetermined percentage (e.g., 80%) of features in the images match the stored features in the database. In another embodiment, an anchor match may be identified if a confidence level is greater than a predetermined percentage (e.g., 70%).

Anchoring can be persisted across different applications on the same system 400. This persistence and anchoring may be achieved by storing a "local" coordinate system defined by features of real-world objects in the scene that are reused between sessions. When two or more users 500A, 500B want to see the same virtual object 510 in the same location on their own respective systems 400 running their respective applications, the anchoring can be done using a shared "global" coordinate system.

The coordinate system may be defined by a collection of points (or features) and their relative configuration. The points (or features) that make up the coordinate system are referred to herein as anchors or spatial anchors. This coordinate system can then be used to render any virtual object (e.g., the virtual 3D car 510) relative to this coordinate system. Just as a constellation of stars can help a person find their location on Earth, a set of anchors 520A, 520B provides a frame of reference to render a virtual object (e.g., the virtual 3D car 510).

A problem may arise when the environment changes between the time the anchors 520A, 520B are created and the time that a user is viewing through the same environment with the AR system 400. The change can be drastic enough that the matching would fail, hence making the anchors 520A, 520B unusable. For static environments, this is not an issue. However, in practice, environments can be dynamic. In one example, the chairs or tables in an office can move around after the dataset of anchors is created. In another example, one or more signs may be added that were not there when the dataset of anchors is created. In another example, repair work may bring in new equipment on a factory floor after the dataset of anchors is created. Thus, there are numerous scenarios where the features detected during the use of the AR system 400 may not match those that were part of the anchor definition at the time of creation. To counter this, a user may either redo the anchors 520A, 520B each time a change occurs or make the anchors themselves be more resilient to change. The present disclosure creates anchors 520A, 520B that are resilient to changes in dynamic environments.

Resilience in anchors 520A, 520B may be achieved through selectivity. More particularly, the anchors 520A, 520B may be filtered based upon what the user selects. For example, when a window on a wall is identified as a feature to be used, an "admin" user in charge of locking down the features may review these features in an application. The application may present the features, and the user may "select" the window-related features and discard them from the collection. This may be because a window may be often open or closed or partially open, and hence, likely to fail matching. Thus a "safer" option may be to just use the wall feature or just the frame of the window and not the entire window. Another selection approach may be based on the object type. For example, the feature(s) on certain types of objects may just be rejected, as those objects are often temporary. For example, orange cones at a production site may simply be ignored. A computer vision system that does object classification may be used to determine the object type.

The anchors 520A, 520B may also be filtered based upon context and/or domain. The context and/or domain may be related to the activity in progress when the dataset is captured (e.g., by the sensor 420). For example, at a drill site when a drilling operation is in progress, one or more objects may be moved from their default locations. The anchors 520A, 520B may also be filtered based upon changes detected over a time period. For example, the portions that did not change may be selected as anchors (i.e., eliminate transient elements).

In an example, on a shop floor, certain machinery may be on castors/wheels and hence may move around. Thus, the computing system 430 (or user) may not select the moveable machinery to serve as an anchor by explicitly identifying it as moveable. In another embodiment, the computing system 430 (or user) may deduce that because the machinery has wheels that it is moveable, and thus not select it to serve as an anchor. The computing system 430 (or user) may also analyze the machinery to see which parts are stationary or movable and not select the moveable parts to serve as an anchor. The computing system 430 (or user) can also detect which objects are moving over a predetermined time period and not select the moveable parts to serve as an anchor. This may be done by taking longer observations and comparing which parts changed and which stayed the same.

In real-time scenarios, there may be people moving in the foreground while the anchors 520A, 520B are being established. The computing system 430 may detect the people moving, and the points belonging to those people may be automatically removed from consideration for being selected to serve as an anchor. The detection can be at an object level (e.g., a whole person) or at a pixel level (e.g., a portion of the person). At the pixel level, the computing system 430 may use the optical flow information from one frame to another to analyze moving objects.

For scenarios where movement is more infrequent, the computing system 430 may use computer vision-based object detection to classify points that belong to those objects that can move. For example, a piece of furniture may be moveable but may be moved infrequently. These objects may be stored into the computing system 430 as child object in a hierarchy. The computing system 430 may then generate a tag based on the class of the object, and the tag may identify the object as fixed or movable. The computing system 430 may also determine the object type using computer vision, a human annotation, or from a catalog of pre-determined object types.

Example Hierarchical Anchor Tree

Figure 8:
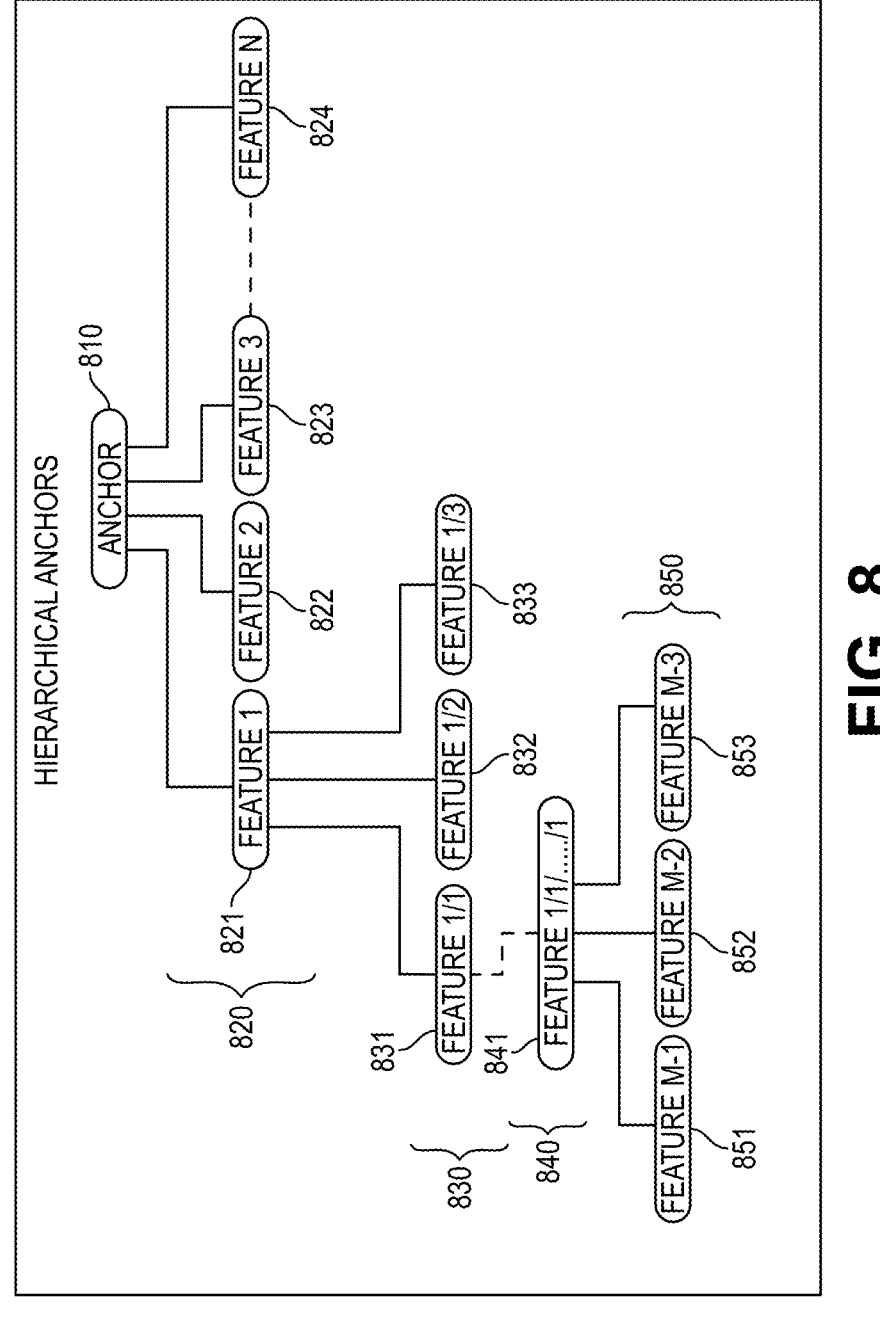
FIG. 8 illustrates a schematic view of a hierarchical anchor tree, according to an embodiment.

FIG. 8 illustrates a schematic view of a hierarchical anchor tree 800, according to an embodiment. The tree 800 may include one or more anchors (one is shown: 810) and a plurality of features that are in one or more levels of a hierarchy (four levels are shown: 820-850). The anchor 810 may be based upon one or more of the features in the levels 820-850. The features in the higher levels (e.g., level 820) may have a greater weight value for generating the anchor and the features in the lower levels (e.g., level 850).

In one embodiment, the feature 821 may include or be based upon one or more sub-features (three are shown 831-833) in the second level 830. The hierarchical relationship of the feature 821 and the sub-features 831-833 may be part of a container-contained relationship. The container-features 821 may be the "parent" of the contained-features 831-833, and the contained-features 831-833 may be the "children." For example, in a factory, the structure (e.g., walls, floor) of the factory may be the parent features, while the equipment in the factory may be the child features. Having this provides the ability to selectively remove features, such as when equipment is removed (e.g., rented out).

In another example, the wall may be the parent/container feature, and a window may be the child/contained feature. This may begin with a list of corners as features. What makes the four corners of a wall be considered part of the "wall" feature and the other four corners of a window on this wall be considered part of "window" feature, is how the computing system (or user) decides to relate to them with each other. Taking the stars in the sky analogy, a constellation is a somewhat arbitrary graph with which the stars are connected. In the present case, the computing system can do this connection in a better way but looking at some other properties of these corners. For example, is there an edge connecting them, or is the normal of the surface pointing the same way, or are they in the same plane, or one could even try to fit some other geometric shape such as a circle using one of the many computer vision algorithms, such as RANSAC (Random Sampling and Consensus). Once the corners have been grouped, a convex hull may be used to define the borders of this group, and that can then be used to see if other features are within these.

In one example, if the computing system 430 (or user) wants to use valves as anchors, a pipeline containing the valves may be marked as the parent, and the valves may be marked as children. The computing system 430 (or user) can ignore everything in the tree 800 except for the valves. In another example, if the system (or user) wants to put virtual signs marking the path to an exit during an earthquake, the computing system 430 (or user) may establish them with respect to the permanent structures of the building such as the walls and stairs. If walls make the top node of the hierarchy, then the child nodes may be ignored, and the top node may be used.

In one embodiment, every feature in the tree 800 (e.g., under a node) may be used as an anchor. For example, the features 821-824, 831-833, 841, 851-853 may be used as anchors. In another embodiment, parts of the sub-tree (e.g., the features in levels 820, 830) may be used as anchors. The tree 800 may be pruned or traversed to do selective matching. More particularly, the tree 800 may be traversed, and nodes may be selected whose features satisfy a certain selection criterion.

Hierarchical anchoring differs from object level anchoring. The object level anchoring may not have the "context" included. Context may be an aspect in displaying virtual objects. For example, fire extinguishers mounted on a wall are likely to be full and functional as opposed to fire extinguishers that are in a warehouse and stacked against many other fire-extinguishers. The decision on when to use pure object level anchoring or to use hierarchical anchoring can be made by the computing system 430 (or user). The computing system 430 (or user) can "collapse" a hierarchy of anchors into a single object-level anchor by merging the features into a single node.

Example Flowchart for Hierarchy Creation

Figure 9:
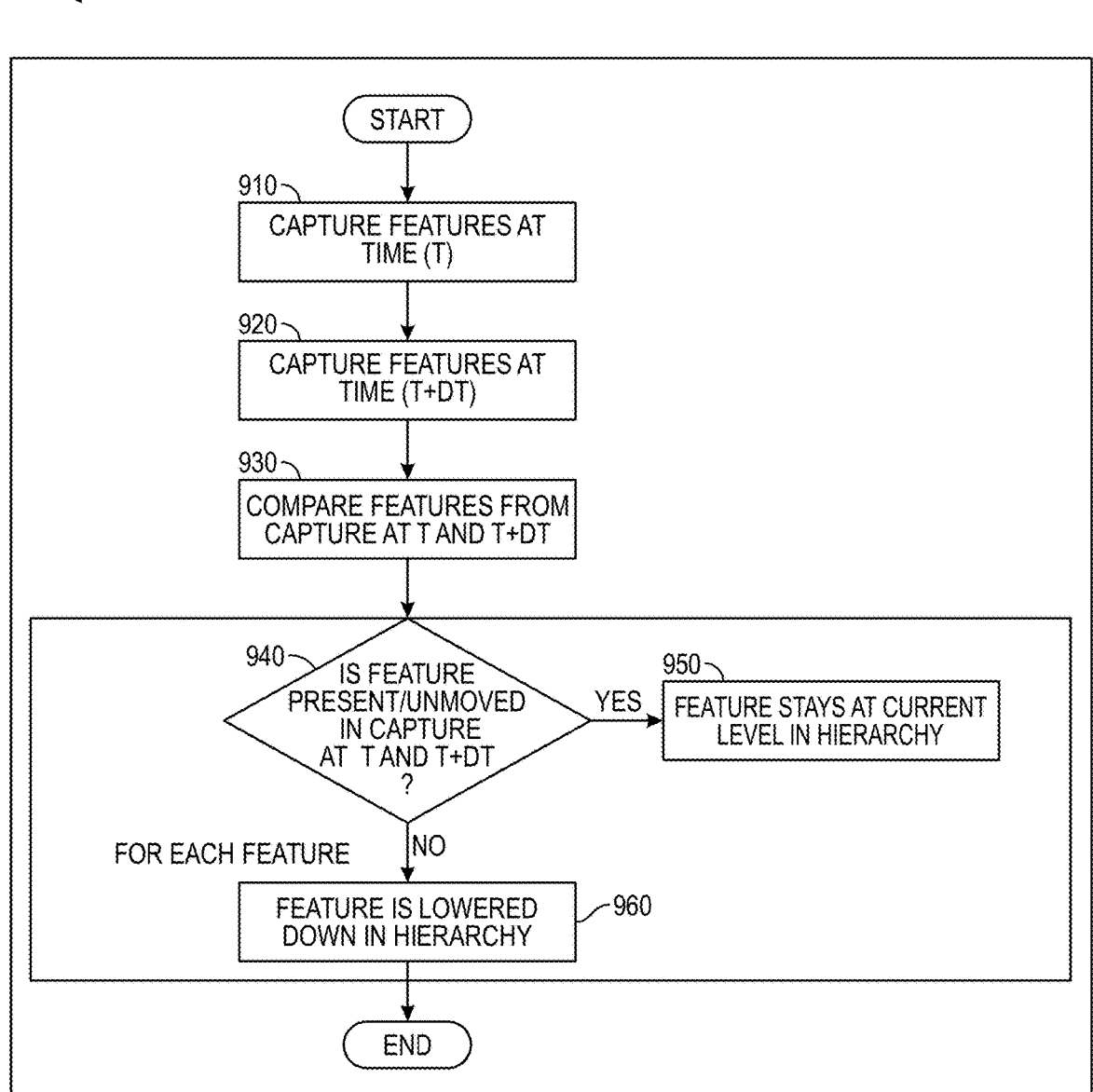
FIG. 9 illustrates a flowchart of a method for hierarchy creation based upon temporal consistency, according to an embodiment.

A timeline or time window may be used with the anchors. In one embodiment, if a feature moves or disappears within a predetermined time window, the feature is converted into a lower level (e.g., from level 820 to level 830). FIG. 9 illustrates a flowchart of a method 900 for hierarchy creation based upon temporal consistency, according to an embodiment. The method 900 may include capturing one or more features at a first time, as at 910. The features may be captured using the sensor(s) 420. The method 900 may also include capturing one or more features at a second time, as at 920. The feature(s) captured at the second time may be the same as, or different from, the feature(s) captured at the first time. The second time may be before or after the first time.

The method 900 may also include comparing the feature(s) captured at the first time to the feature(s) captured at the second time, as at 930. The method 900 may also include determining whether the feature(s) captured at the second time are present and/or at the same location as the feature(s) captured at the first time, as at 940. If the feature(s) are present and at the same location, then the method 900 may determine that the feature(s) remain at the current level in the hierarchy, as at 950. If the feature(s) are not present and/or are present but not at the same location, then the method 900 may move the feature(s) down a level in the hierarchy, as at 960.

Example Flowchart for Temporal Consistency-Based Selection

Figure 10:
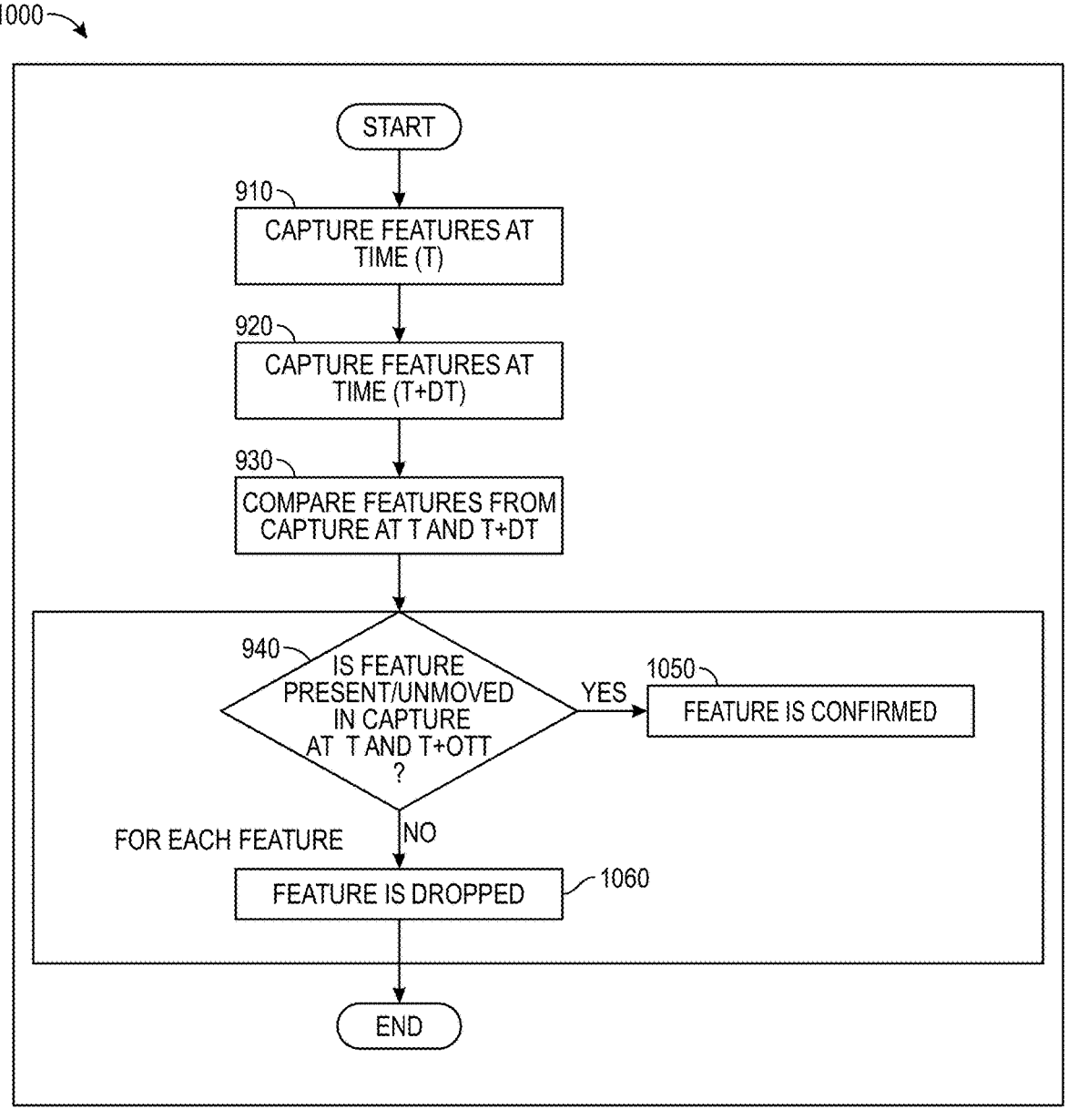
FIG. 10 illustrates a flowchart of a method for temporal consistency-based selection, according to an embodiment.

In another embodiment, if a feature moves or disappears within the predetermined time window, the feature is dropped from the hierarchy and no longer considered as part of the feature set of the anchor. FIG. 10 illustrates a flowchart of a method 1000 for temporal consistency-based selection, according to an embodiment. The method 1000 may be similar to the method 900, except that if the feature(s) are present and at the same location, then the method 1000 may determine that the feature(s) are confirmed, as at 1050. If the feature(s) are not present and/or are present but not at the same location, then the method 1000 may drop the feature(s) from the hierarchy, as at 1060.

In another embodiment, rather than moving the feature down a level or dropping the feature, a second anchor may be created. For example, if the computing system 430 is creating a first anchor close to a door that remains open during normal office hours, the computing system 430 may not get a match after office hours when that door may be closed. Thus, the computing system 430 may create two different anchors for the two different positions of the door (e.g., open and closed). In other words, the computing system 430 may create a second anchor for the door in the closed position. However, that may create confusion for any virtual objects that may be placed at those locations. Thus, the anchors may have an associated time coordinate which may be used to decide whether the time falls inside of a "window" of time for the match to be a success. The time value may be the hour of the day that is relevant when deciding whether to call the receptionist (e.g., during business hours) or the emergency hotline (e.g., outside of business hours). In an example, a virtual sign may be placed on the door in the open position based upon the first anchor during business hours, and the virtual sign (or a different virtual sign) may be placed on the door in the closed position based upon the second anchor outside of business hours. In another example, facility tours can become more robust in response to changes in the environment. In another example, training exercises on equipment that use A/R may work in more scenarios regardless of location. In another example, direction signs may not be disrupted due to parking equipment or vehicles.

Example Flowchart for User Choice-Based Selection

Figure 11:
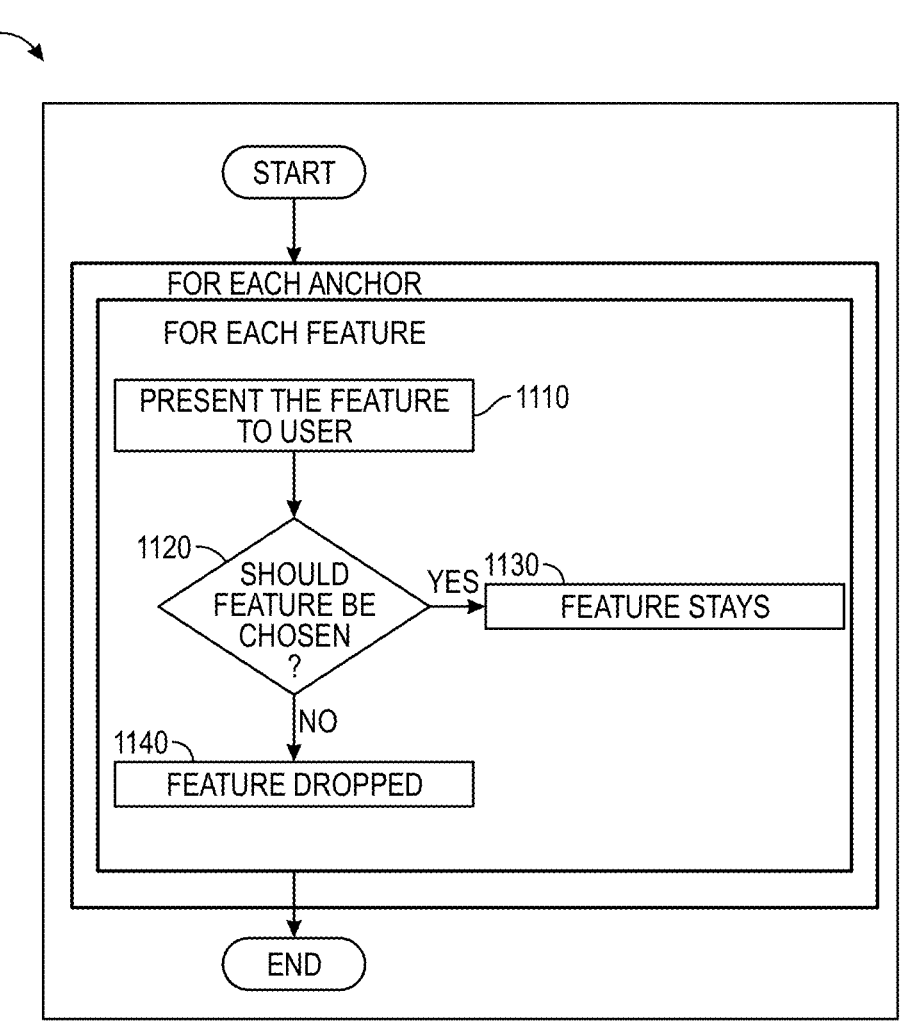
FIG. 11 illustrates a flowchart of a method for user choice-based selection, according to an embodiment.

In one embodiment, a feature may be presented to the computing system 430 (or a user) to decide whether it should be part of the anchor or a parent feature. FIG. 11 illustrates a flowchart of a method 1100 for user choice-based selection, according to an embodiment. The method 1000 may include presenting the feature, as at 1110. The method 1100 may also include determining whether the feature should be selected, as at 1120. If the feature is selected, the feature may stay, as at 1130. If the feature is not selected, the feature may be dropped, as at 1140.

Exemplary Method for Feature Dimension Comparison

Figure 12:
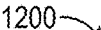
FIG. 12 illustrates a flowchart of a method for feature dimension comparison to determine a hierarchical relationship, according to an embodiment.

For two or more features (e.g., a pair of features) at the same level of hierarchy, one feature's spatial dimensions may be compared with the spatial dimensions of the surrounding features to establish the parent-child relationship. FIG. 12 illustrates a flowchart of a method 1200 for feature dimension comparison to determine a hierarchical relationship, according to an embodiment. The method 1200 may include determining the spatial dimensions of a first feature, as at 1210. The method 1200 may also include determining the spatial dimensions of a second feature, as at 1220. The first and second features may be at the same level (e.g., level 820) in the hierarchy, or they may be at different levels.

The method 1200 may also include determining whether the first feature is within the second feature, as at 1230. If the first feature is within the second feature, the method 1200 may move the first feature to a lower level (e.g., level 830) in the hierarchy, as at 1240. More particularly, the first feature may be made a child of the second feature.

If the first feature is not within the second feature, the method 1200 may determine whether the second feature is within the first feature, as at 1250. If the second feature is within the first feature, the method 1200 may move the second feature to a lower level (e.g., level 830) in the hierarchy, as at 1260. More particularly, the second feature may be made a child of the first feature. If the second feature is not within the first feature, the first and second features may remain at their current (e.g., same) level.

The spatial anchor may be or include one or more features. These features may be points, lines, planes, curves, or any other geometric feature either directly measured or extracted from the viewable image. The computing system 430 may run AI inferencing on captured points and clouds, and the computing system 430 may assign appropriate segmentation/label to them the captured points and clouds based upon the AI inferencing. More particularly, the computing system 430 may assign segmentation and/or labels such as potentially movable, portable, and/or articulated. For example, vehicles may be assigned the "movable" label and could be potentially excluded. The anchors may be edited in an application such that the user can select which features to include and which to exclude. The features may be sorted into hierarchies of parent-child relationships. Time durations and/or or time intervals may be assigned and denote the "activation" criterion of an anchor. The area may be sampled during the creation of the anchors for a predetermined amount of time (e.g., seconds, minutes, hours, and/or days)

based on the frequency with which transient events occur. For example, a car park may have changes in a 12-hour window.

As mentioned above, conventional systems generate persistent robust anchors that persist despite changes to the environment. In other words, these anchors may not be triggered due to new objects being introduced. In addition, multiple anchors are triggered when many of them are created at the same location or near each other but were supposed to activate during various times.

The system and method described herein address these issues by providing selectivity—by excluding objects that change and/or move often and including more permanent structures. The system and method also generate hierarchies to allow anchoring to enclosing vs enclosed objects. The system and method may also link the anchors to time windows. By having a timestamp when searching for a match, the selectivity may be extended during execution based on time.

The system and method may also be implemented in facilities where new structures are being constructed, and the yet to be constructed but planned virtual structures can still be visualized. This may make facility tours more resilient to temporary changes. For example, placards or signage posted during a conference/convention may prevent conventional anchors from working. However, the anchors generated with the system and method herein may continue to work. Work done by one user to establish an anchor may be reusable across multiple users even with a wide variety of changes.

Conventional spatial anchors can get confused when new objects are introduced. For example, during maintenance, "orange" cones or warning signs may be erected and may prevent a previously-established anchor from working. By recognizing these orange cones and signage, the system and method may eliminate them from the anchor database. Better persistence of anchors may result in a better user experience. In addition, better granularity of anchoring allows more changes in the environment to not affect the persistence of the anchor.

Example Flowchart for Creating Anchors

FIG. 13 illustrates a flowchart of a method for creating anchors that are resilient to changes in a dynamic environment, according to an embodiment. An illustrative order of the method 1300 is provided below; however, one or more portions of the method 1300 may be performed in a different order, simultaneously, repeated, or omitted.

Figure 14:
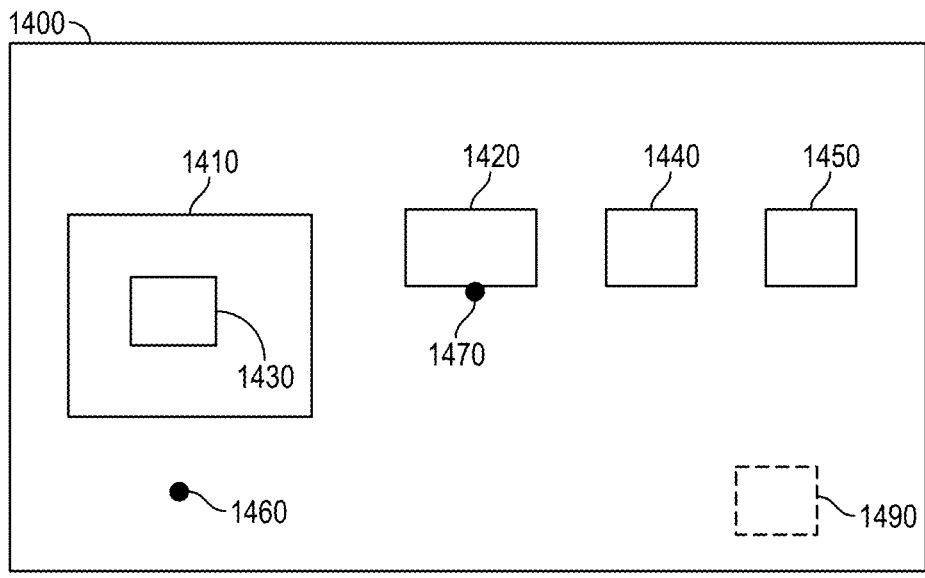
FIG. 14 illustrates a schematic view of the first dataset of the environment, according to an embodiment.

The method 1300 may include capturing a first dataset of an environment 1400 at a first time, as at 1305. FIG. 14 illustrates a schematic view of the first dataset of the environment 1400, according to an embodiment. The environment 1400 may be, for example, a wellsite or an interior of a factory. The first dataset may be captured with a sensor 420 of a first system 400. The sensor 420 may be or include a red-green-blue (RGB) camera, an infrared camera, a lidar, or a combination thereof. The first system 400 may be or include an augmented reality (AR) system or a mixed reality (MR) system.

The method 1300 may also include identifying a plurality of features in the first dataset, as at 1310. The plurality of features may include at least a first feature 1410, a second feature 1420, a third feature 1430, a fourth feature 1440, a fifth feature 1450, or a combination thereof. In an example, the first feature 1410 may be or include a permanent structure (e.g., a wall of a building), the second feature 1420 may be or include a chair, the third feature 1430 may be or include a structural beam in the wall, the fourth feature 1440 may be or include a desk, and the fifth feature 1450 may be or include a mail cart.

The method 1300 may also include determining that the third feature 1430 is within the first feature 1410, as at 1315.

The method 1300 may also include generating a hierarchy of features (e.g., hierarchy tree 800), as at 1320. The hierarchy may include the first feature 1410, the second feature 1420, the third feature 1430, the fourth feature 1440, the fifth feature 1450, or a combination thereof. The hierarchy may be generated based upon the first feature 1410, the second feature 1420, the third feature 1430, the fourth feature 1440, and/or the fifth feature 1450 in the first dataset. The third feature 1430 may be a lower level (e.g., child in level 830) of the first feature 1410 (e.g., parent in level 820) in the hierarchy in response to the third feature 1430 being within the first feature 1410. The fourth feature 1440 may be a lower level (e.g., child in level 830) in the hierarchy.

Figure 15:
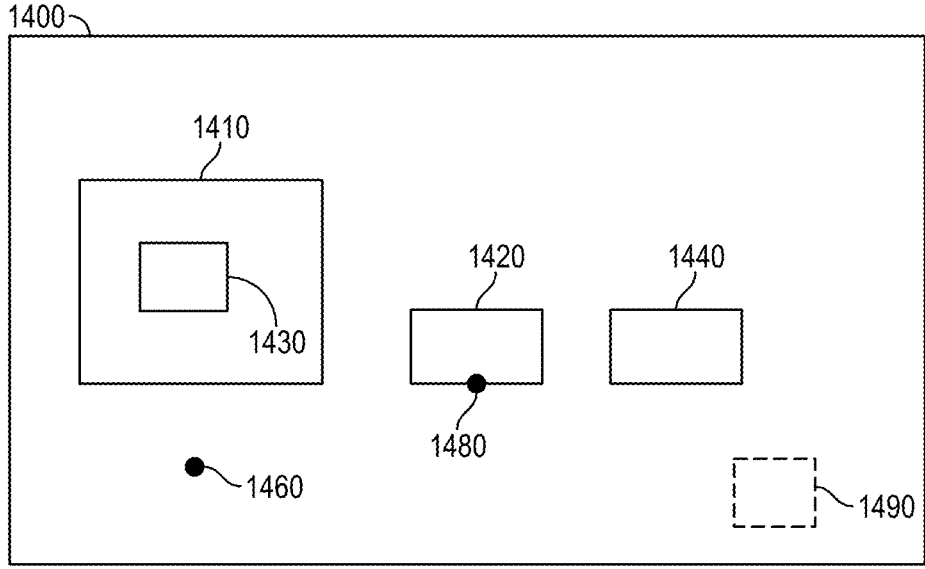
FIG. 15 illustrates a schematic view of the second dataset of the environment, according to an embodiment.

The method 1300 may also include capturing a second dataset of the environment 1400 at a second time, as at 1325. The second dataset may be captured with the sensor 420 of the first system 400. The second time may be before or after the first time. FIG. 15 illustrates a schematic view of the second dataset of the environment 1400, according to an embodiment.

The method 1300 may also include identifying one or more of the features 1410-1450 in the second dataset, as at 1330. In an example, this may include the first feature 1410, the second feature 1420, the third feature 1430, and the fourth feature 1440 (but not the fifth feature 1450). In the example shown, the first feature 1410 may be in a same location in the first dataset and the second dataset, the second feature 1420 may be in different locations in the first dataset and the second dataset, the fourth feature 1440 may be in different locations in the first dataset and the second dataset, and the fifth feature 1450 may not be present in the second dataset.

The method 1300 may also include updating the hierarchy of features, as at 1335. The hierarchy may be updated based upon the first feature 1410, the second feature 1420, the third feature 1430, and/or the fourth feature 1440 in the second dataset.

Updating the hierarchy may include moving the second feature 1420 to a lower level (e.g., level 830) in the hierarchy of features, as at 1336. This may be in response to the second feature 1420 being in different locations. Updating the hierarchy may also include switching the fourth feature 1440 to be a child of a different one of the plurality of features, as at 1337. This may be in response to the fourth feature 1440 being in different locations. Updating the hierarchy may also include removing the fifth feature 1450 from the hierarchy of features, as at 1338. This may be in response to the fifth feature 1450 not being present in the second dataset.

The method 1300 may also include generating a first anchor 1460 in response to updating the hierarchy of features, as at 1340. The first feature 1410 having a higher level than the second feature 1420, third feature 1430, and/or fourth feature 1440 may cause the first feature 1410 to have a greater weight value than the second feature 1420 for matching the first anchor 1460, of which the first feature 1410 and the second feature 1420 may be a part.

The method 1300 may also include generating a second anchor 1470 in response to updating the hierarchy of features, as at 1345. The second anchor 1470 may be present during a first time window (e.g., 8 AM-5 PM) based upon the second feature 1420 being in different locations in the first dataset and the second dataset.

The method 1300 may also include generating a third anchor 1480 in response to updating the hierarchy of features, as at 1350. The third anchor 1480 may be present during a second time window (e.g., 5 PM-8 AM) based upon the second feature 1420 being in different locations in the first dataset and the second dataset. The first and second time windows may be different. The second and third anchors 1470, 1480 may be in different locations (e.g., based upon the locations of the second feature 1420).

The method 1300 may also include generating a virtual object 1490, as at 1355. The virtual object 1490 may be generated inside a headset or a screen 410 of the first system 400. In an embodiment, the virtual object 1490 may be simultaneously generated inside a headset or a screen 410 of a second system 400. A position of the virtual object 1490 may be based upon the first anchor 1460, the second anchor 1470, the third anchor 1480, or a combination thereof. For example, the position may be based upon the first anchor 1460 and the second anchor 1470 during the first time window, and upon the first anchor 1460 and the third anchor 1480 during the second time window.

In an embodiment, the method 1300 may also include performing an action. The action may be performed in response to the updated hierarchy, the anchor(s), the virtual object, or a combination thereof. The action may be or include generating and/or transmitting a signal (e.g., using a computing system) that instructs or causes a physical action to occur (e.g., at a wellsite). The action may also or instead include performing the physical action at the wellsite. The physical action may include selecting where to drill a wellbore, drilling the wellbore, varying a weight and/or torque on a drill bit that is drilling the wellbore, varying a drilling trajectory of the wellbore, varying a concentration and/or flow rate of a fluid pumped into the wellbore, or the like.

In another embodiment, when trying to visualize how a new piece of equipment might fit into an existing space, the virtual object of the equipment may be positioned, and a user may examine it in relation to the space it occupies, how much space is left, safety, and other aspects. In another embodiment, the virtual objects may be used for training (e.g., a car mechanic may be trained on the interior of a car). In another embodiment, a step by step instruction may be generated that includes animated virtual objects. In the sports realm, a user (e.g., a player) may use the virtual object to train (e.g., a golfer hitting a golf ball or a baseball player hitting a baseball). In another embodiment, virtual objects may be signage that can provide a guided tour to the user of a facility. In yet another embodiment, different virtual designs may be cycled through to study their impact. For example, new buildings may be placed to see their impact on the skylines.

Exemplary Computing System

Figure 16:
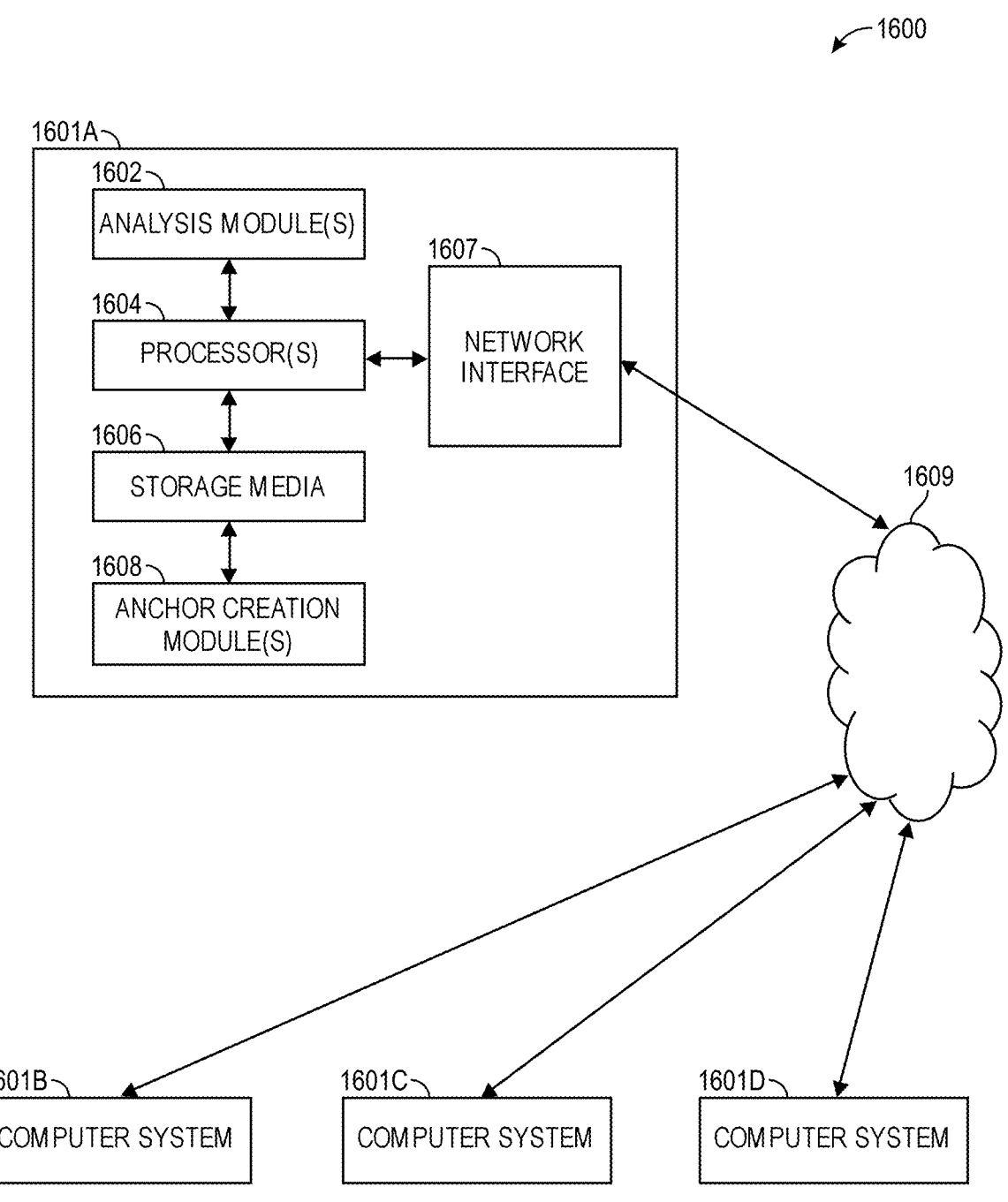
FIG. 16 illustrates a computing system for performing at least a portion of the method(s) disclosed herein, according to an embodiment.

In some embodiments, any of the methods of the present disclosure may be executed by a computing system. FIG. 16 illustrates an example of such a computing system 1600, in accordance with some embodiments. The computing system 1600 may include a computer or computer system 1601A, which may be an individual computer system 1601A or an arrangement of distributed computer systems. The computer system 1601A includes one or more analysis module(s) 1602 configured to perform various tasks according to some embodiments, such as one or more methods disclosed herein. To perform these various tasks, the analysis module 1602 executes independently, or in coordination with, one or more processors 1604, which is (or arc) connected to one or more storage media 1606. The processor(s) 1604 is (or are) also connected to a network interface 1607 to allow the computer system 1601A to communicate over a data network 1609 with one or more additional computer systems and/or computing systems, such as 1601B, 1601C, and/or 1601D (note that computer systems 1601B, 1601C and/or 1601D may or may not share the same architecture as computer system 1601A, and may be located in different physical locations, e.g., computer systems 1601A and 1601B may be located in a processing facility, while in communication with one or more computer systems such as 1601C and/or 1601D that are located in one or more data centers, and/or located in varying countries on different continents).

A processor can include a microprocessor, microcontroller, processor module or subsystem, programmable integrated circuit, programmable gate array, or another control or computing device.

The storage media 1606 can be implemented as one or more computer-readable or machine-readable storage media. Note that while in the example embodiment of FIG. 16 storage media 1606 is depicted as within computer system 1601A, in some embodiments, storage media 1606 may be distributed within and/or across multiple internal and/or external enclosures of computing system 1601A and/or additional computing systems. Storage media 1606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1600 contains one or more anchor creation module(s) 1608 that may perform at least a portion of one or more of the method(s) described above. It should be appreciated that computing system 1600 is only one example of a computing system, and that computing system 1600 may have more or fewer components than shown, may combine additional components not depicted in the example embodiment of FIG. 16, and/or computing system 1600 may have a different configuration or arrangement of the components depicted in FIG. 16. The various components shown in FIG. 16 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAS, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1600, FIG. 16), and/or through manual control by a user who may make determinations regarding whether a given step, action, template, model, or set of curves has become sufficiently accurate for the evaluation of the subterranean three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for creating spatial anchors that are resilient to changes in a dynamic environment, the method comprising:

capturing a first dataset of an environment with a sensor of a system at a first time;

identifying a plurality of features in the first dataset, wherein the plurality of features comprises at least a first feature, a second feature, a third feature, a fourth feature, and a fifth feature;

generating a hierarchy of the features including the first feature, the second feature, the third feature, the fourth feature, and the fifth feature, wherein the hierarchy of features is generated based upon the first feature, the second feature, the third feature, the fourth feature, and the fifth feature in the first dataset;

capturing a second dataset of the environment with the sensor of the system at a second time, wherein the second time is after the first time;

identifying the first feature, the second feature, the third feature, and the fourth feature in the second dataset, wherein the first feature is in a same location in the first dataset and the second dataset, wherein the second feature is in different locations in the first dataset and the second dataset, wherein the fourth feature is in different locations in the first dataset and the second dataset, and wherein the fifth feature is not present in the second dataset;

updating the hierarchy of the features based upon the first feature, the second feature, the third feature, and the fourth feature in the second dataset, wherein updating the hierarchy comprises:

moving the second feature to a lower level in the hierarchy of features in response to the second feature being in different locations;

switching the fourth feature to be a child of a different one of the plurality of features in response to the fourth feature being in different locations; and removing the fifth feature from the hierarchy of features in response to the fifth feature not being present in the second dataset;

filtering one or more of the plurality of features to identify resilient spatial anchors that have a higher likelihood of matching the one or more of the plurality of features at the second time;

generating a first spatial anchor in response to updating the hierarchy of the features and in response to the filtering, wherein the first spatial anchor comprises a collection of points in a coordinate system used to render a virtual object; and generating the virtual object based upon the first spatial anchor.

2. The method of claim 1, wherein the sensor comprises a red-green-blue (RGB) camera, an infrared camera, a lidar, or a combination thereof, and wherein the system comprises an augmented reality (AR) system or a mixed reality (MR) system.

3. The method of claim 1, wherein updating the hierarchy of the features comprises moving the second feature to a lower level in the hierarchy of the features in response to the second feature being in different locations.

4. The method of claim 3, wherein the first feature having a higher level than the second feature causes the first feature to have a greater weight value than the second feature for matching the first spatial anchor, wherein the first spatial anchor comprises the first feature and the second feature.

5. The method of claim 1, wherein the second feature is determined to be within the first feature such that the first feature and the second feature have a container-contained relationship, and wherein the second feature is a child of the first feature in the hierarchy of features in response to the second feature being within the first feature.

6. The method of claim 1, wherein the second feature is a child of the first feature in the hierarchy of the features when the hierarchy of features is generated, and wherein updating the hierarchy of the features comprises switching the second feature to be a child of a different one of the plurality of features in response to the second feature being in different locations.

7. The method of claim 1, wherein the virtual object is generated inside a headset or a screen of the system.

8. The method of claim 7, further comprising:

generating a second spatial anchor that is present during a first time window based upon the first feature being in different locations in the first dataset and the second dataset; and generating a third spatial anchor that is present during a second time window based upon the first feature being in different locations in the first dataset and the second dataset, wherein the first time window and the second time window are different, and wherein the second spatial anchor and the third spatial anchor are in different locations.

9. The method of claim 8, wherein a position of the virtual object is based upon the first spatial anchor and the second spatial anchor during the first time window and upon the first spatial anchor and the third spatial anchor during the second time window.

10. A computing system, comprising:

one or more processors; and a memory system comprising one or more non-transitory computer-readable media storing instructions that, when executed by at least one of the one or more processors, cause the computing system to perform operations, the operations comprising:

capturing a first dataset of an environment with a sensor of a system at a first time;

identifying a plurality of features in the first dataset, wherein the plurality of features comprises at least a first feature, a second feature, a third feature, a fourth feature, and a fifth feature;

generating a hierarchy of features including the first feature, the second feature, the third feature, the fourth feature, and the fifth feature, wherein the hierarchy of features is generated based upon the first feature, the second feature, the third feature, the fourth feature, and the fifth feature in the first dataset;

capturing a second dataset of the environment with the sensor of the system at a second time, wherein the second time is after the first time;

identifying the first feature, the second feature, the third feature, and the fourth feature in the second dataset, wherein the first feature is in a same location in the first dataset and the second dataset, wherein the second feature is in different locations in the first dataset and the second dataset, wherein the fourth feature is in different locations in the first dataset and the second dataset, and wherein the fifth feature is not present in the second dataset;

updating the hierarchy of features based upon the first feature, the second feature, the third feature, and the fourth feature in the second dataset, wherein updating the hierarchy comprises:

moving the second feature to a lower level in the hierarchy of features in response to the second feature being in different locations;

switching the fourth feature to be a child of a different one of the plurality of features in response to the fourth feature being in different locations; and removing the fifth feature from the hierarchy of features in response to the fifth feature not being present in the second dataset;

filtering one or more of the plurality of features to identify resilient spatial anchors that have a higher likelihood of matching the one or more of the plurality of features at the second time;

generating a first spatial anchor in response to updating the hierarchy of features and in response to the filtering, wherein the first spatial anchor comprises a collection of points in a coordinate system used to render a virtual object; and generating the virtual object based upon the first spatial anchor.

11. The computing system of claim 10, wherein the first feature having a higher level than the second feature causes the first feature to have a greater weight value than the second feature for matching the first spatial anchor, wherein the first spatial anchor comprises the first feature and the second feature.

12. The computing system of claim 10, wherein the virtual object is generated inside a headset or a screen of the system.

13. The computing system of claim 12, further comprising:

generating a second spatial anchor that is present during a first time window based upon the second feature being in different locations in the first dataset and the second dataset; and generating a third spatial anchor that is present during a second time window based upon the second feature being in different locations in the first dataset and the second dataset, wherein the first time window and the second time window are different, wherein the second spatial anchor and the third spatial anchor are in different locations.

14. The computing system of claim 13, wherein a position of the virtual object is based upon the first spatial anchor and the second spatial anchor during the first time window and upon the first spatial anchor and the third spatial anchor during the second time window.

15. A non-transitory computer-readable medium storing instructions that, when executed by a computer processor of a computing device, causes the computing device to perform operations, the operations comprising:

capturing a first dataset of an environment with a sensor of a first system at a first time, wherein the sensor comprises a red-green-blue (RGB) camera, an infrared camera, a lidar, or a combination thereof, and wherein the first system comprises an augmented reality (AR) system or a mixed reality (MR) system;

identifying a plurality of features in the first dataset, wherein the plurality of features comprises at least a first feature, a second feature, a third feature, a fourth feature, and a fifth feature;

determining that the third feature is within the first feature such that the first feature and the third feature have a container-contained relationship;

generating a hierarchy of features including the first feature, the second feature, the third feature, the fourth feature, and the fifth feature, wherein the hierarchy of features is generated based upon the first feature, the second feature, the third feature, the fourth feature, and the fifth feature in the first dataset, wherein the third feature is a child of the first feature in the hierarchy of features in response to the third feature being within the first feature, and wherein the fourth feature is a child in the hierarchy of features;

capturing a second dataset of the environment with the sensor of the first system at a second time, wherein the second time is after the first time;

identifying the first feature, the second feature, the third feature, and the fourth feature in the second dataset, wherein the first feature is in a same location in the first dataset and the second dataset, wherein the second feature is in different locations in the first dataset and the second dataset, wherein the fourth feature is in different locations in the first dataset and the second dataset, and wherein the fifth feature is not present in the second dataset;

updating the hierarchy of features based upon the first feature, the second feature, the third feature, and the fourth feature in the second dataset, wherein updating the hierarchy comprises:

moving the second feature to a lower level in the hierarchy of features in response to the second feature being in different locations;

switching the fourth feature to be a child of a different one of the plurality of features in response to the fourth feature being in different locations; and removing the fifth feature from the hierarchy of features in response to the fifth feature not being present in the second dataset;

filtering one or more of the plurality of features to identify resilient spatial anchors that have a higher likelihood of matching the one or more of the plurality of features at the second time;

generating a first spatial anchor in response to updating the hierarchy of features and in response to the filtering, wherein the first spatial anchor comprises a collection of points in a coordinate system used to render a virtual object, and wherein the first feature having a higher level than the second, third, and fourth features causes the first feature to have a greater weight value than the second, third, and fourth features for matching the first spatial anchor; and generating the virtual object inside a headset or a screen of the first system based upon the first spatial anchor.

16. The non-transitory computer-readable medium of claim 15, further comprising generating a second spatial anchor that is present during a first time window based upon the second feature being in different locations in the first dataset and the second dataset, wherein the virtual object is also generated based upon the second spatial anchor.

17. The non-transitory computer-readable medium of claim 16, further comprising generating a third spatial anchor that is present during a second time window based upon the second feature being in different locations in the first dataset and the second dataset, wherein the first and second time windows are different, wherein the second spatial anchor and the third spatial anchor are in different locations, and wherein the virtual object is also based upon the third spatial anchor.

18. The non-transitory computer-readable medium of claim 17, wherein a position of the virtual object is based upon the first spatial anchor and the second spatial anchor during the first time window and upon the first spatial anchor and the third spatial anchor during the second time window.

19. The non-transitory computer-readable medium of claim 15, further comprising generating the virtual object inside a headset or a screen of a second system based upon the first spatial anchor simultaneously with generating the virtual object inside the headset or the screen of the first system.

* * * * *